Dec. 16, 1952 S. O. DORST 2,622,133

SEALED ELECTRICAL CIRCUIT COMPONENTS

Filed May 1, 1950

INVENTOR
STANLEY O. DORST
BY Arthur G. Connolly
ATTORNEY

Patented Dec. 16, 1952

2,622,133

UNITED STATES PATENT OFFICE 2,622,133

SEALED ELECTRICAL CIRCUIT COMPONENTS

Stanley O. Dorst, North Adams, Mass., assignor to Sprague Electric Company, North Adams, Mass., a corporation of Massachusetts Application May 1, 1950, Serial No. 159,197

5 Claims. (Cl. 175—315)

Figure 1:
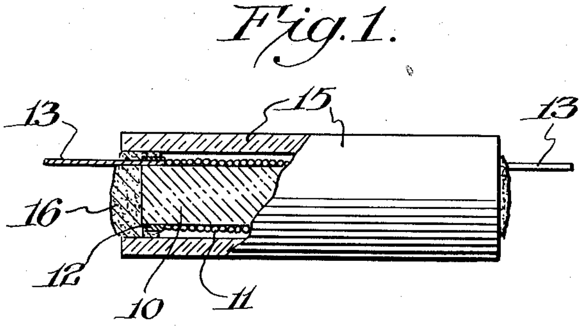

This invention relates to improved electrical circuit components and more specifically refers to cement seals particularly adapted for sealing the leads to such components.

In an earlier application Serial Number 576,074 filed February 3, 1945, now abandoned, of which the present application is a continuation-in-part, there is disclosed a melamine-formaldehyde resin cement a considerable portion of which is a non-hydrolyzable, refractory inorganic filling material such as silica, ground mica, steatite, etc., which do not react with water to give electrolytes. The cement is quite inexpensive to use in view of its low resin content, yet wets wires, ceramics and other plastic surfaces to form a water- and heat-resistant seal.

In an earlier application Serial Number 704,824 filed October 22, 1946, now Patent No. 2,596,134, as a continuation-in-part of application Serial Number 576,074, it is disclosed that the above sealing cement may be greatly improved and particularly adapted for sealing electrical condensers and related components which are extremely sensitive to moisture per se. This improvement is accomplished by filling the pores of the cement with a moisture-resistant wax or oil, preferably of high melting point, by vacuum impregnation.

Cements have been widely used to seal various elements of electrical circuit components from corrosive atmospheres, moisture, etc. When cement is to be used in equipment designed for operation at temperatures under 100° C., many types have been found suitable, for example, rubber, rubber-like organic resins, phenol-formaldehyde condensation resins, alkyd (ester) resins and other moisture-resistant materials. Unfortunately, however, it has not been possible to produce a sealing cement capable of continued use at the temperatures encountered in the operation of high-wattage electrical resistors and other electrical circuit components due to the instability of the organic components in the sealing cement.

It is an object of this invention to produce a new and improved high-temperature electrical circuit component. A still further object is to produce an electrical circuit component having end seals which are very inexpensive and adhere permanently to the component housing. A further object is to produce a sealed electrical circuit component capable of use at temperatures exceeding 150° C. over extended periods of time without failure. A still further object is to produce a sealed electrical circuit component having end seals which do not produce electrolytes upon contact with water in liquid or vapor state. Additional objects will become apparent from the following description and claims.

These objects are attained in accordance with the present invention wherein there is produced an electrical circuit component comprising an electric circuit element housed in a casing and having a terminal lead, an opening in said casing through which said lead projects for external connecting in a circuit, and a moisture-resistant insulating end seal composed of a hard in situ cured uniform mixture of from about 70 to 90% by weight of a non-hydrolyzable refractory material and from about 30 to 10% by weight of a melamine-formaldehyde resin, sealing the casing opening around the terminal lead. In one of its more limited embodiments the present invention pertains to the above electrical circuit component wherein the electrical circuit element is a resistor, capacitor or inductor.

Figure 2:
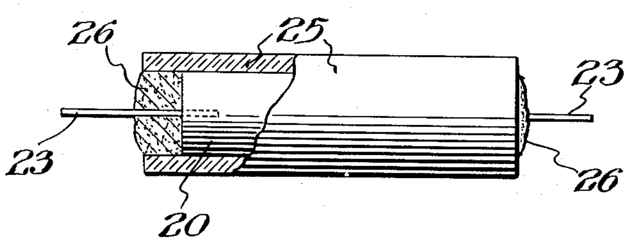
Figure 3:
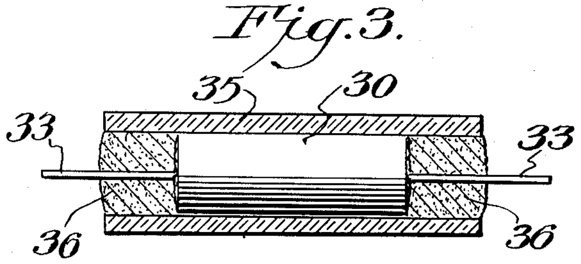

The invention will be more fully described with reference to the appended drawings wherein Figure 1 shows in partial cross-section a finished wire wound resistor according to one embodiment of the present invention, Figure 2 shows in partial cross-section a finished carbon resistor in accordance with another embodiment of this invention, and Figure 3 shows a cross-section of an electrolytic condenser according to still another embodiment of this invention.

Referring to Figure 1, 10 represents the resistor core and is either a tube or a solid rod of moisture-resistant inorganic material such as porcelain, steatite, etc. 11 represents the resistance wire winding, attached to terminal band 12. Also attached to terminal band 12 is terminal lug or lead 13, which in accordance with the invention is preferably tinned metal, generally copper. Circumferentially surrounding the wound element is insulated casing 15, which is a moisture-resistant ceramic tube such as steatite. The sealing cement is shown as 16 and engages both the terminal lead 13 and the inorganic structural elements 10 and 15. Following its application thereto and baking thereon, the cement will adhere permanently to the leads 13, as well as to the casing 15 and core 10.

Figure 2 shows a different embodiment of the invention. Here a carbon resistor element 20 has molded therein tinned metal terminal leads 23. The entire unit is housed in tubular casing 25. The terminal leads 23 project out from the openings at each end of the tubular casing.

These openings are sealed by means of end cement 26.

Figure 3 represents an encased electrolytic condenser according to this invention. Condenser section 30 has connected thereto terminal leads 33. The section is housed in casing 35. The casing openings at each end of the casing are sealed around the terminal leads 33 by cement 36. Electrolytic condenser section 30 may be wound and impregnated as disclosed in U. S. P. 2,444,725 issued to J. Burnham on July 6, 1948. The condenser terminal leads 32, 33 may both extend from the same end of the condenser winding, or individually from each end of the winding as shown in Figure 3. Electrolytic condensers generate small amounts of gas during use, and a porous housing is generally required to permit the escape of the generated gas. The end seal composition of the present invention provides a small amount of porosity sufficient to such gas escape. The penetration of a minute quantity of water into an electrolytic condenser section has little or no effect on the continued operation of the condenser. The same leakage of water into a dry paper condenser section however, produces highly undesirable results. For sealing paper condenser sections a substantially completely moisture-proof end seal such as disclosed in copending application Serial Number 704,824 is preferred.

It has been found that sealing cements employing melamineformaldehyde resins in amounts varying from about 10% to about 20% may be operated over extended periods at temperatures in excess of 150° C. without failure. Without solvent the preferred cement contains melamine-formaldehyde in an amount varying from about 10% to about 30% by weight of the total solids, in conjunction with from about 90% to about 70% by weight of an inorganic filler. While the melamine-formaldehyde resins have been specifically mentioned, it should be understood that as a secondary embodiment the use of other thermosetting resins exhibiting the characteristics of melamine-formaldehyde condensation resins in lieu thereof or in admixture therewith are contemplated. It appears that the resins should be hydrophilic before complete polymerization thereof and dispersable in water or other water soluble solvent.

It has been further found that the sealing cements disclosed herein possess an unusually high degree of adherence both to hydrophilic materials, such as ceramic resistor cores and casings as well as paper casings, and to hydrophobic materials such as tinned metals leads, terminals, clamps, etc. While the reason for this desirable and specific cooperation between the cement and other elements, particularly the tinned metal is not fully understood, it may be due to the reaction of the cement during the baking process, to be more fully discussed hereafter. In addition this phenomenon has never been observed with prior sealing cements of either organic or inorganic type. It would be expected that the presence of water would prevent bonding to the metal.

It has also been found that the cement, following baking, possesses a thermal coefficient of expansion in the range of that possessed by steatite and related inorganic materials which are generally employed as resistor cores and covers.

The solvent is employed to facilitate application of the cement, and is removed during the baking and curing processes. While water is a specific example of a solvent, other water-soluble solvents may also be employed with satisfactory results. Among these are glycol, a mixture of glycol and water and a mixture of water and dioxan. It will be apparent that the selection of the solvent is largely dependent upon the specific resin employed, baking temperature, etc.

It should be explained that the word "solvents," as referred to herein, does not necessarily indicate that the resin completely dissolves therein. The resin is generally, at least, dispersed therein. It is used only to facilitate application of the cement and is substantially removed during the baking operation.

It is often desirable to add coloring matter to the cement to improve the appearance thereof, without detrimentally affecting its physical and electrical properties. For this purpose, it is preferred to employ inorganic coloring materials such as burnt umber. Likewise, non-conducting non-hydrolizing organic coloring materials of high thermal stability may be used. Among these are the copper phthalocyanines and fully chlorinated derivatives thereof.

The baking time and temperature is largely dependent upon the solvent employed, and the original cure of the resin, that is, the extent of polymerization before use in the cement. For example, a sealing cement of the following proportions was prepared:

| | Parts |
|---|---|
| Silica (ground) | 1000 |
| Melamine-formaldehyde resin (ground) | 200 |
| Water | 190 |
| Burnt umber | 40 |

The mixture was well pasted together and applied to a resistor, such as described in connection with Figure 1. The unit was then air dried for 15 hours and thereafter subjected to a baking operation for 2 hours at 85° C. to complete the solvent removal. Following this, the finished resistor was placed in operation, developing a hot-spot temperature of about 275° C., the temperature at the cement being slightly less than this. The cement did not shrink or crack. The resistor was then subjected to humidity tests in the usual manner. The seal was unaffected and the resistor performed very satisfactorily after the test. Prolonged operation at the rated wattage did not impair the seal, and corrosion of the resistance wire did not occur. Similar results were obtained with carbon type resistors and electrolytic condensers prepared in accordance with this invention. When paper housings or electrolytic condensers are sealed, the end seals are cured by baking at 85° C. for three hours after drying.

While this invention pertains in particular to resistor elements, and the cement is highly improved for most condenser applications by impregnating it with a wax or oil as described in copending application Serial Number 704,824, the construction disclosed herein is per se an improvement over past electrolytic condenser constructions. Though the cement per se is not strictly moisture-proof, it is moisture-resistant. In fact, for most applications the penetration of water is so minute that it can be considered moisture proof. The cement will not react chemically with water; therefore, in high temperature applications any minute quantity of water entering the assembly will be vaporized and/or evaporated instantly without damage to the encased electrical circuit component. Though resistors and capacitors have been disclosed in detail, it should be understood that the invention pertains to other electrical circuit components such as R. F. chokes; selenium rectifiers; R. F. transformers, etc., where the unusual adherence of the cement, when cured, to ceramic and metal surfaces is of value. It is possible that the cement disclosed herein may be used to encase the entire electrical circuit component thus forming a sturdy molded assembly. The contents of application Serial Number 704,824 is hereby incorporated in the present disclosure.

It should be pointed out that the sealing cements of the invention have been described with the solvent therein, and that their composition following the baking operation will be changed accordingly, by the removal of the solvent. For example, a sealing cement may be applied with the following proportions: 71% silica, 15% melamine-formaldehyde resin, and 14% water. This cement will ultimately possess a composition as follows: 82.6% silica and 17.4 melamine-formaldehyde resin.

As many apparently widely different embodiments of this invention may be made without departing from the spirit and scope hereof, it is to be understood that the invention is not limited to the specific embodiments hereof, except as defined in the appended claims.

What is claimed is:

1. An electrical circuit component comprising an electric circuit element housed in a casing and having a terminal lead, an opening in said casing through which said lead projects for external connecting in a circuit, and a moisture-resistant insulating seal composed of a hard in situ cured uniform mixture of from about 70 to 90% by weight of a non-hydrolyzable refractory material and from about 30 to 10% by weight of a melamine-formaldehyde resin, sealing the casing opening around the terminal lead.

2. An electrical resistor element housed in a tubular casing, terminal leads connected to and projecting from said resistor element, openings at each end of said casing through which said terminal leads extend, and an in situ cured uniform mixture of from about 70 to 90% by weight of a non-hydrolyzable refractory material and from about 30 to 10% by weight of a melamine-formaldehyde resin, sealing the casing openings around the terminal leads.

3. An electrical resistor element having an insulating core upon which is wound a resistance wire, a tubular steatite casing housing said resistor element, tinned copper terminal leads connected to and extending from said resistor element, openings at each end of said casing through which said terminal leads extend, and moisture resistant, insulating end seals composed of an in situ cured uniform mixture of from about 70 to 90% by weight of a non-hydrolyzable refractory material and from about 30 to 10% by weight of a melamine-formaldehyde resin sealing the casing openings around the terminal leads.

4. An electrical resistor element comprising a wound resistor wire, a tubular casing housing said resistor element, tinned metal leads connected to and extending from said resistor element, openings at each end of said casing through which said terminal leads extend, and moisture resistant, insulating end seals composed of an in situ cured uniform mixture of about 82.6% by weight of a non-hydrolyzable refractory material and about 17.4% by weight of a melamine-formaldehyde resin sealing the casing around the terminal leads.

5. An electrolytic condenser impregnated with an electrolyte and housed in a tubular casing, terminal leads connected to and projecting from said condenser, openings at each end of said casing through which said terminal leads extend, and a hard electrolyte-impervious in situ cured uniform mixture of from about 70 to 90% by weight of a non-hydrolyzable refractory material and from about 30 to 10% by weight of a melamine-formaldehyde resin, sealing the casing openings around the terminal leads.

STANLEY O. DORST.

REFERENCES CITED

The following references are of record in the file of this patent:

UNITED STATES PATENTS

| Number | Name | Date |
|---|---|---|
| 2,282,459 | Deely | May 12, 1942 |
| 2,285,136 | Abendroth | June 2, 1942 |
| 2,355,788 | Dunleavey | Aug. 15, 1944 |
| 2,521,614 | Valyi | Sept. 5, 1950 |

FOREIGN PATENTS

| Number | Country | Date |
|---|---|---|
| 104,382 | Australia | July 7, 1938 |